(12) United States Patent
Lu et al.

(10) Patent No.: US 9,100,180 B2
(45) Date of Patent: Aug. 4, 2015

(54) METHOD, DEVICE AND COMMUNICATION SYSTEM FOR RETRANSMISSION BASED ON FORWARD ERROR CORRECTION

(75) Inventors: Yadong Lu, Shenzhen (CN); Bing Chen, Shenzhen (CN); Changquan Ai, Shenzhen (CN); Weie Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 890 days.

(21) Appl. No.: 13/309,351

(22) Filed: Dec. 1, 2011

(65) Prior Publication Data

US 2012/0079339 A1    Mar. 29, 2012

Related U.S. Application Data

(63) Continuation of application No. PCT/CN2010/073425, filed on Jun. 1, 2010.

(30) Foreign Application Priority Data

Jun. 1, 2009   (CN) .......................... 2009 1 0107560

(51) Int. Cl.
*H03M 13/00*   (2006.01)
*H04L 1/18*   (2006.01)
*H04L 1/16*   (2006.01)

(52) U.S. Cl.
CPC ............ *H04L 1/1819* (2013.01); *H04L 1/1621* (2013.01); *H04L 1/1816* (2013.01); *H04L 1/1845* (2013.01)

(58) Field of Classification Search
CPC .... H04L 1/1819; H04L 1/1816; H04L 1/1845

USPC .......................................................... 714/751
See application file for complete search history.

(56) References Cited

U.S. PATENT DOCUMENTS

| | | | | |
|---|---|---|---|---|
| 4,888,767 A | * | 12/1989 | Furuya et al. | 370/243 |
| 5,600,663 A | * | 2/1997 | Ayanoglu et al. | 714/774 |
| 6,079,042 A | * | 6/2000 | Vaman et al. | 714/755 |
| 6,104,757 A | * | 8/2000 | Rhee | 375/240.12 |
| 6,145,109 A | * | 11/2000 | Schuster et al. | 714/752 |

(Continued)

FOREIGN PATENT DOCUMENTS

| | | |
|---|---|---|
| CN | 1476199 | 2/2004 |
| CN | 2662570 | 12/2004 |

(Continued)

OTHER PUBLICATIONS

Partial Translation of First Chinese Office Action of Chinese Application No. 2009/10107560.6, Jul. 3, 2012, 29 pages.

(Continued)

*Primary Examiner* — Joseph D Torres

(57) ABSTRACT

Embodiments of the present invention provide a method for retransmission based on forward error correction. The method includes: when received source data packets loss occurs, judging whether all of the lost source data payloads can be decoded by using the received source data payloads and check data; if all of the lost source data payloads cannot be decoded, determining needed source data symbols for decoding all of the lost source data payloads by using the received source data payloads and the check data; and requesting for retransmitting the needed source data symbols.

9 Claims, 9 Drawing Sheets

(56) References Cited

U.S. PATENT DOCUMENTS

| | | | |
|---|---|---|---|
| 6,243,846 B1* | 6/2001 | Schuster et al. | 714/776 |
| 6,278,716 B1 | 8/2001 | Rubenstein et al. | |
| 6,289,054 B1* | 9/2001 | Rhee | 375/240.27 |
| 6,421,387 B1* | 7/2002 | Rhee | 375/240.27 |
| 6,487,690 B1* | 11/2002 | Schuster et al. | 714/752 |
| 6,490,705 B1* | 12/2002 | Boyce | 714/776 |
| 6,891,799 B1* | 5/2005 | Hagai et al. | 370/235 |
| 7,224,702 B2 | 5/2007 | Lee | |
| 7,328,393 B2* | 2/2008 | Chawla et al. | 714/774 |
| 7,376,880 B2* | 5/2008 | Ichiki et al. | 714/751 |
| 7,409,627 B2* | 8/2008 | Kim et al. | 714/776 |
| 7,733,913 B1* | 6/2010 | Cheung et al. | 370/474 |
| 7,930,617 B1* | 4/2011 | Gass et al. | 714/784 |
| 8,499,212 B2* | 7/2013 | Wu et al. | 714/751 |
| 8,566,662 B2* | 10/2013 | Suneya | 714/751 |
| 2002/0114283 A1 | 8/2002 | Lee | |
| 2003/0021240 A1* | 1/2003 | Moon et al. | 370/320 |
| 2003/0039218 A1 | 2/2003 | Kwak | |
| 2003/0076870 A1* | 4/2003 | Moon et al. | 375/130 |
| 2003/0226092 A1* | 12/2003 | Kim et al. | 714/776 |
| 2005/0154965 A1* | 7/2005 | Ichiki et al. | 714/776 |
| 2005/0180415 A1* | 8/2005 | Cheung et al. | 370/389 |
| 2006/0048036 A1* | 3/2006 | Miura et al. | 714/758 |
| 2006/0064626 A1* | 3/2006 | Fischer et al. | 714/776 |
| 2006/0224745 A1* | 10/2006 | Sharpe et al. | 709/227 |
| 2007/0121639 A1* | 5/2007 | Degrande et al. | 370/394 |
| 2008/0039825 A1 | 2/2008 | Lai | |
| 2008/0065971 A1* | 3/2008 | Betts | 714/800 |
| 2009/0063928 A1* | 3/2009 | Gondo et al. | 714/752 |
| 2009/0067551 A1* | 3/2009 | Chen et al. | 375/340 |
| 2009/0103635 A1* | 4/2009 | Pahalawatta | 375/240.27 |
| 2009/0193314 A1* | 7/2009 | Melliar-Smith et al. | 714/755 |
| 2009/0271681 A1* | 10/2009 | Piret et al. | 714/749 |
| 2009/0276678 A1* | 11/2009 | Ihara | 714/751 |
| 2009/0292966 A1* | 11/2009 | Liva et al. | 714/752 |
| 2009/0327844 A1* | 12/2009 | Suneya | 714/776 |
| 2010/0005360 A1* | 1/2010 | Begen et al. | 714/751 |

FOREIGN PATENT DOCUMENTS

| | | |
|---|---|---|
| CN | 101043296 A | 9/2007 |
| CN | 101340271 A | 1/2009 |
| CN | 101562152 A | 10/2009 |
| EP | 1 385 292 A2 | 1/2004 |
| EP | 1 562 317 A2 | 8/2005 |
| WO | WO 2008/033645 A2 | 3/2008 |

OTHER PUBLICATIONS

Written Opinion of the International Searching Authority dated Sep. 9, 2010 in connection with International Patent Application No. PCT/CN2010/073425.

Communication dated Mar. 5, 2012 in connection with European Patent Application No. 10 782 969.9.

"DVB-IP FEC with Feedback", Digital Fountain, Inc., Mar. 19, 2012, 15 pages.

ITU-T Recommendation G.984.3, "Gigabit-capable Passive Optical Networks (G-PON): Transmission convergence layer specification", Feb. 2004, 114 pages.

International Search Report dated Sep. 9, 2010 in connection with International Patent Application No. PCT/CN2010/073425.

* cited by examiner

| | | | | |
|---|---|---|---|---|
| 1 | F | L | D | |
| 2 | | | D | P |
| ...... | | | ...... | |
| K | F | L | D | |
| K+1 | | | D | |
| K+2 | | | D | P |
| ...... | | | ...... | |
| M-1 | | | D | |
| M | | | R | |
| ...... | | | ...... | |
| M+n | | | R | |

FIG. 2

$$\text{Full rank matrix B} \begin{pmatrix} 0 & 1 & 1 \\ 1 & 1 & 0 \\ 0 & 1 & 0 \end{pmatrix}$$

ESI number  6  7  9

FIG. 5c $$\text{Full rank matrix B} \begin{pmatrix} 0 & 1 & 1 \\ 1 & 1 & 0 \\ 0 & 0 & 1 \end{pmatrix}$$

ESI number  6  7  9

FIG. 5d $$\text{Loss matrix A'} \begin{pmatrix} 0 & 1 & 1 \\ 0 & 0 & 0 \end{pmatrix}$$

ESI number  6  7  9

FIG. 5e

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |                              SBN                              |
   +-+-+-+-+-+-+-+-+-+-+-+-+-+-+-+-+-+-+-+-+-+-+-+-+-+-+-+-+-+-+-+-+
   |             ESC              |             ESI 1              |
   +-+-+-+-+-+-+-+-+-+-+-+-+-+-+-+-+-+-+-+-+-+-+-+-+-+-+-+-+-+-+-+-+
   |             ESI 2            |             ......             |
   +-+-+-+-+-+-+-+-+-+-+-+-+-+-+-+-+-+-+-+-+-+-+-+-+-+-+-+-+-+-+-+-+
   |             ESI n            |            padding             |
   +-+-+-+-+-+-+-+-+-+-+-+-+-+-+-+-+-+-+-+-+-+-+-+-+-+-+-+-+-+-+-+-+
```

FIG. 6

| Type | SBN | IsSrc | startEsi | count | IsSrc | startEsi | count | ... |

```
                    0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|reserved |   PT=XR=207   |             length            |
+-+-+-+-+-+-+-+-+-+-+-+-+-+-+-+-+-+-+-+-+-+-+-+-+-+-+-+-+-+-+-+-+
|                             SSRC                              |
+-+-+-+-+-+-+-+-+-+-+-+-+-+-+-+-+-+-+-+-+-+-+-+-+-+-+-+-+-+-+-+-+
|                         report blocks                         |
+-+-+-+-+-+-+-+-+-+-+-+-+-+-+-+-+-+-+-+-+-+-+-+-+-+-+-+-+-+-+-+-+
```

FIG. 8b

```
                    0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     BT=X      | type-specific |         block length          |
+-+-+-+-+-+-+-+-+-+-+-+-+-+-+-+-+-+-+-+-+-+-+-+-+-+-+-+-+-+-+-+-+
|                              SBN                              |
+-+-+-+-+-+-+-+-+-+-+-+-+-+-+-+-+-+-+-+-+-+-+-+-+-+-+-+-+-+-+-+-+
|           srcCount            |           RbCount             |
+-+-+-+-+-+-+-+-+-+-+-+-+-+-+-+-+-+-+-+-+-+-+-+-+-+-+-+-+-+-+-+-+
|        begin_Src_ESI1         |         src_count1            |
+-+-+-+-+-+-+-+-+-+-+-+-+-+-+-+-+-+-+-+-+-+-+-+-+-+-+-+-+-+-+-+-+
|        begin_Src_ESI2         |         src_count2            |
+-+-+-+-+-+-+-+-+-+-+-+-+-+-+-+-+-+-+-+-+-+-+-+-+-+-+-+-+-+-+-+-+
|             ...               |             ...               |
+-+-+-+-+-+-+-+-+-+-+-+-+-+-+-+-+-+-+-+-+-+-+-+-+-+-+-+-+-+-+-+-+
|        begin_Rb_ESI1          |         rb_count1             |
+-+-+-+-+-+-+-+-+-+-+-+-+-+-+-+-+-+-+-+-+-+-+-+-+-+-+-+-+-+-+-+-+
|        begin_Rb_ESI2          |         rb_count2             |
+-+-+-+-+-+-+-+-+-+-+-+-+-+-+-+-+-+-+-+-+-+-+-+-+-+-+-+-+-+-+-+-+
|             ...               |             ...               |
+-+-+-+-+-+-+-+-+-+-+-+-+-+-+-+-+-+-+-+-+-+-+-+-+-+-+-+-+-+-+-+-+
```

FIG. 8c

METHOD, DEVICE AND COMMUNICATION SYSTEM FOR RETRANSMISSION BASED ON FORWARD ERROR CORRECTION

CROSS-REFERENCE TO RELATED APPLICATIONS

This application is a continuation of International Application No. PCT/CN2010/073425, filed on Jun. 1, 2010, which claims priority to Chinese Patent Application No. 200910107560.6, filed on Jun. 1, 2009, both of which are hereby incorporated by reference in their entireties.

TECHNICAL FIELD

The present invention relates to the field of communication transmission, in particular, to a method, a client device, a server, and a communication system for retransmission based on forward error correction.

BACKGROUND

A packet switching network is being used to transmit streaming media content, where video and audio data is transmitted from one media server to multiple receivers, and the receivers include computer terminals, set-top boxes, and the like. Packet loss occurs in the packet switching network, and in order to effectively ensure the quality of streaming media services, a hybrid (Hybrid) solution of combining forward error correction (Forward Error Correction, forward error correction) and ARQ (Automatic Retransmission Request, automatic retransmission request) is provided in the prior art to transmit streaming media content.

In the hybrid transmission solution of combining forward error correction and ARQ, a sender sends source data packets PKT1, PKT2, PKT3 . . . bearing media data, and meanwhile, buffers the media data packets in a retransmission module. Each streaming media data packet has a life cycle, so these media data packets only need to be buffered for a certain period of time. Forward error correction encoding is performed on all or part of the source data packets to generate forward error correction check data packets RPKT1, RPKT2 . . . of a certain ratio, and the check data packets are sent to the receiver along with the corresponding source data packets. When packet loss occurs after the media stream is transmitted over the network, the receiver attempts to restore the lost source data packets by performing forward error correction decoding operation. If the decoding succeeds, the restored source data packets are sent to an upper layer application. If the decoding fails, the forward error correction check data packets are discarded, and meanwhile, a retransmission request is sent to a repairing module to request for retransmitting the lost source data packets. After receiving the retransmission requests, the repairing module judges whether the retransmission requests are valid by estimating playing time of the source data packets requested to be retransmitted. If the retransmission requests are valid, the repairing module sends the requested source data packets to the receiver. After receiving the retransmitted source data packets, the receiver sends the packets to the upper layer application.

In the prior art, in the hybrid transmission solution of combining the forward error correction and ARQ, when the forward error correction decoding fails, the corresponding check data packets are totally discarded, and all of the lost source data packets are retransmitted, which causes huge waste of data, and meanwhile, the retransmitting all of the lost source data packets also occupies network resources and increases transmission bandwidth.

SUMMARY

Embodiments of the present invention provide a method for retransmission based on forward error correction, and further provide a client device, a server, and a communication system capable of implementing retransmission based on forward error correction, thereby effectively utilizing data received by the client and reducing network resources occupied by the retransmission.

An embodiment of the present invention provides a method for retransmission based on forward error correction, including:

receiving source data packets carrying source data payloads and check data packets carrying check data;

When source data packets loss occurs, judging whether all of the lost source data payloads can be decoded by using the received source data payloads and the check data;

if all of the lost source data payloads cannot be decoded, determining source data symbols needed for decoding all of the lost source data payloads by using the received source data payloads and the check data; and requesting for retransmitting the needed source data symbols.

An embodiment of the present invention provides another method for retransmission based on forward error correction, including:

receiving, by a server, packet loss situation fed back by a client, where the packet loss situation includes packet loss situation corresponding to source data of a client device and packet loss situation corresponding to check data, and the packet loss situation is sent to the server by the client when source data packets loss occurs and all of the lost source data payloads cannot be decoded by using the received source data payloads and the check data;

determining, by the server, source data symbols needed for decoding all of the lost source data payloads of the client; and sending, by the server, the needed source data symbols to the client.

An embodiment of the present invention provides a client device, including:

a first receiving module, configured to receive source data packets carrying source data payloads and check data packets carrying check data;

a judging module, configured to, When source data packets loss occurs, judge whether all of the lost source data payloads can be decoded by using the received source data payloads and the check data;

a determining module, configured to, if all of the lost source data payloads cannot be decoded, determine source data symbols needed for decoding all of the lost source data payloads by using the received source data payloads and the check data; and a first sending module, configured to send a retransmission request message to a server to request for retransmitting all or part of the needed source data symbols.

An embodiment of the present invention provides a communication system, which includes the client device and a server.

The server includes: a second receiving module, configured to receive a retransmission request message sent by the client device, where the retransmission request message carries ESIs of source data symbols to be retransmitted determined by the client device; a second reconstructing module, configured to generate a reconstructed data block by using source data payloads carried in all source data packets buffered in a period of time; an extracting module, configured to extract the source data symbols to be retransmitted from the reconstructed data block according to the ESIs of the source data symbols to be retransmitted; and a second sending module, configured to send the extracted source data symbols to be retransmitted to the client device.

An embodiment of the present invention provides a server, including:

a fourth receiving module, configured to receive a feedback message carrying packet loss situation of a client device sent by the client device, where the retransmission request message carries packet loss situation corresponding to source data of the client device and packet loss situation corresponding to check data, and the packet loss situation is sent to the server by the client when source data packets loss occurs and all of the lost source data payloads cannot be decoded by using the received source data payloads and the check data;

a fourth determining module, configured to determine source data symbols needed for decoding all of the lost source data payloads of the client device according to the packet loss situation fed back by the client device; and a fourth sending module, configured to send all or part of the needed source data symbols to the client device.

An embodiment of the present invention provides another communication system, which includes the server and a client device.

The client device includes: a third receiving module, configured to receive source data packets carrying source data payloads and check data packets carrying check data; a third judging module, configured to, When source data packets loss occurs, judge whether all of the lost source data payloads can be decoded by using the received source data payloads and the check data; and a third sending module, configured to send a feedback message carrying packet loss situation of the client device to the server if all of the lost source data payloads cannot be decoded.

It can be seen from the technical solutions that, in this embodiment, when all of the lost source data payloads cannot be decoded by using the received source data payloads and the check data, the source data symbols needed for decoding all of the lost source data payloads by using the received source data payloads and the check data are determined, and all or part of the needed source data symbols are requested for retransmission. Therefore, according to the technical solution provided in the embodiments of the present invention, the source data payloads and the check data in the data packets may be fully utilized, thereby improving the utilization rate of the data symbols and reducing the waste of data. Moreover, the needed source data symbols are generally less than the lost source data symbols, and therefore, only a part of the lost source data symbols are retransmitted when retransmitting the needed source data symbols, thereby reducing the overhead of the bandwidth.

BRIEF DESCRIPTION OF THE DRAWINGS

In order to illustrate the technical solutions in embodiments of the present invention or the prior art clearer, the accompanying drawings needed in the descriptions of the embodiments or the prior art are illustrated briefly in the following. Apparently, the accompanying drawings in the following description are only some embodiments of the present invention, and persons of ordinary skill in the art may further obtain other drawings according to the accompanying drawings without any creative effort.

FIG. 2 is a schematic structure diagram of a source data block in the method according to Embodiment 1 of the present invention;

FIG. 3 is a schematic structure diagram of a reconstructed data block in the method according to Embodiment 1 of the present invention;

FIG. 4 is a schematic diagram of a forward error correction scheme matrix in the method according to Embodiment 1 of the present invention;

FIG. 5a is a schematic diagram of a loss matrix A in the method according to Embodiment 1 of the present invention;

FIG. 5b to FIG. 5d are schematic diagrams of a full rank matrix B in the method according to Embodiment 1 of the present invention;

FIG. 5e is a schematic diagram of another loss matrix A' in the method according to Embodiment 1 of the present invention;

FIG. 6 is a schematic diagram of a retransmission request message in the method according to Embodiment 1 of the present invention;

FIG. 8b is a schematic diagram of a RTCP extended message in the method according to Embodiment 2 of the present invention;

FIG. 8c is a schematic diagram of a report blocks format of a RTCP extended message in the method according to Embodiment 2 of the present invention;

DETAILED DESCRIPTION

The technical solutions in the embodiments of the present invention are clearly and fully described below with reference to the accompanying drawings. Apparently, the embodiments to be described are only a part rather than all of embodiments of the present invention. All other embodiments derived by persons of ordinary skill in the art based on the embodiments of the present invention without any creative effort should fall within the protection scope of the present invention.

Embodiment 1

Figure 1:
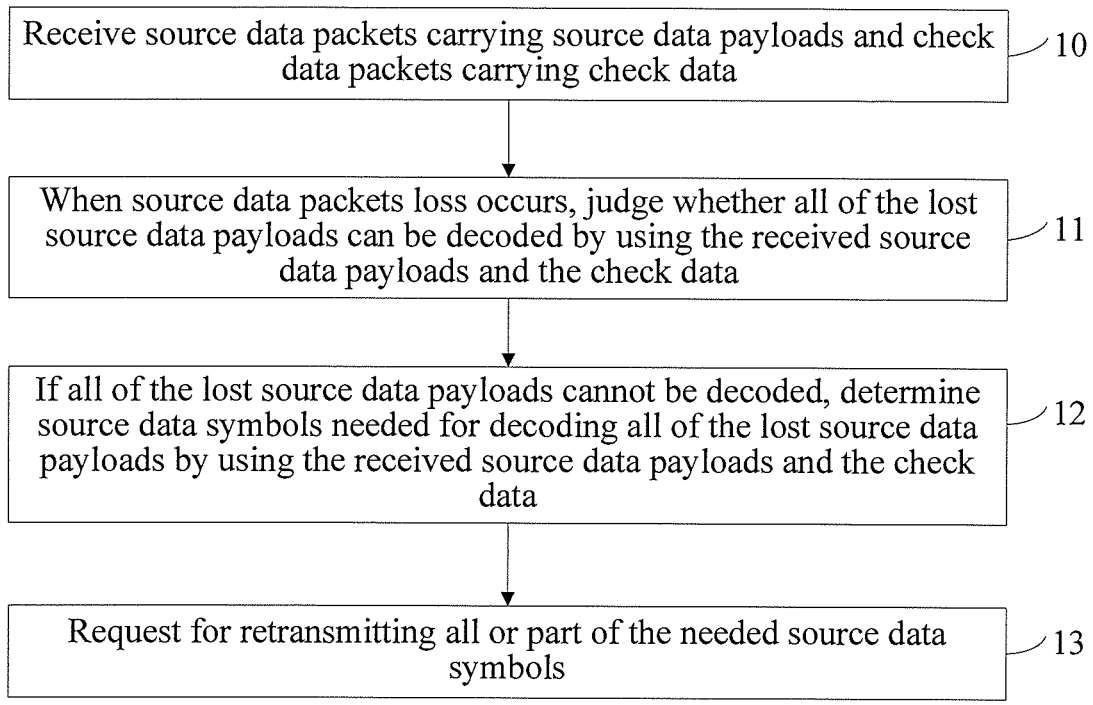
FIG. 1 is a flow chart of a method for retransmission based on forward error correction according to Embodiment 1 of the present invention.

As shown in FIG. 1, an embodiment of the present invention provides a method for retransmission based on forward error correction, where the method includes the following steps.

Step 10: Receive source data packets carrying source data payloads and check data packets carrying check data, where one source data packet may carry one or more source data payloads, and one check data packet may carry one or more check data.

Figure 2:
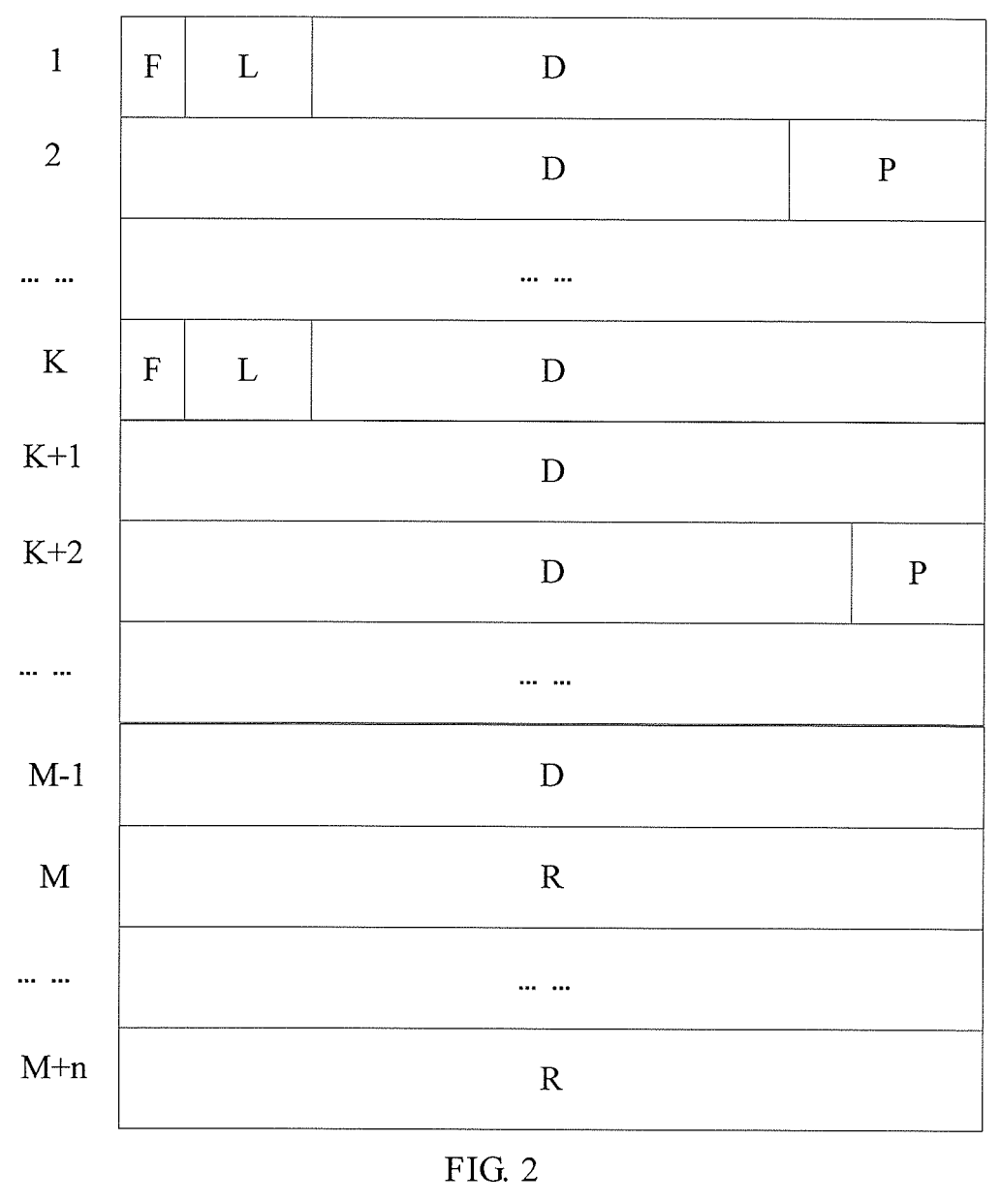

In source data blocks constructed at a sender, one source data block includes multiple source data. Each source data may occupy storage space of one or more symbols (Symbol), and the source data of one symbol is referred to as a source data symbol. The source data block is a storage area formed by multiple symbols, and the constructing the source data block fills the source data into the source data block in a storage unit of symbol, that is, the source data is written into the storage area of the source data block in a storage unit of symbol. Referring to FIG. 2, one source data block is shown, where each row of the source data block indicates the data of a fixed length; each row of the data is referred to as a symbol; each symbol is corresponding to one ESI (Encoding Symbol ID, encoding symbol ID); and each symbol is identified by the corresponding ESI. The ESIs are IDs agreed by both parties of a sender and a receiver, and may be numbered according to an agreed rule, for example, numbered by using a code table or numbered in an ascending or descending order from an initial value. The ESIs in the FIG. 2 are numbered by using an order of natural numbers, and a column of numbers (1, 2, . . . K, K+1, K+2, . . . M, . . . M+n) at the left of the source data block are ESIs corresponding to respective symbols. In the source data block in FIG. 2, each source data may include: a flow mark F of the flow (flow) where the source data payload locates, a length L of the source data payload, a data area D for filling the source data payloads, and a padding area P for filling remaining bits. The padding area P is optional, and when the last symbol of the data area D is filled, the last symbol occupied by the source data has no padding area P (referring to the symbol M−1 in FIG. 2), and when only one flow exists, the flow mark F is also optional. In the source data block in FIG. 2, the first source data includes a symbol 1 (that is, the symbol at the first row and having an ESI of 1) and a symbol 2, and another source data in the source data block includes a symbol K, a symbol K+1, and a symbol K+2. The source data payload in one source data is referred to as one source data payload, that is, each source data includes one source data payload. Multiple source data symbols included in one source data are referred to as the source data symbols corresponding to the source data payload in the source data. One source data payload may be corresponding to one or more source data symbols.

Thereafter, the sender performs the forward error correction encoding on the source data symbols in the constructed source data block, so as to generate one or more check data. The forward error correction encoding here may use various forward error correction encoding algorithms, which is not limited in the present invention. Different source data symbols may be checked respectively to generate multiple check data, and different check data are obtained by performing the forward error correction encoding on different source data symbols. Alternatively, one check data is generated for all the source data symbols in the source data block, or one or more check data are generated according to a certain rule (for example, a forward error correction scheme). After the check data is generated, the check data may also be added to the last of the source data block. Each check data may occupy the storage space of one or more symbols, and the check data of one symbol is referred to as a check data symbol. Referring to FIG. 2, if the (M−1)$^{th}$ row is the last source data symbol added in the source data block, one or more generated check data are added to the M$^{th}$ row to the (M+n)$^{th}$ row of the source data block. At this time, the check data symbols and the source data symbols adopt a sequential ESI numbering rule. Alternatively, after the check data is generated, the check data may be used as an independent check data block, and the check data block may be differentiated by adopting a SBN (Source Block Number, source block number) different from that of the constructed source data block. Alternatively, after the check data is generated, the check data may adopt an independent ESI numbering rule, and at this time, the check data symbols are corresponding to the same SBN with the source data symbols in the constructed source data block. For example, the source data symbols in the source data block having the SBN of 1 have ESIs from 1 to 100, and the check data generated by using the source data symbols occupy 20 symbols, where the 20 check data symbols have ESIs from 1 to 20. In this way, the 100 source data symbols and the 20 check data symbols correspond to the same SBN, that is, 1. The source data symbols and the check data symbols corresponding to the same SBN may be differentiated by adopting certain identifications (for example, the source data packets and the check data packets are sent from different ports respectively, so that a port number corresponding to the source data payloads is different from a port number corresponding to the check data, and in this way, the receiver may differentiate the source data payloads and the check data corresponding to the same SBN through the port numbers).

Finally, the sender sends the source data packets carrying the source data payloads to the receiver, and sends the check data packets carrying the check data to the receiver. One source data payload included in one source data may be carried in one source data packet, and one or more check data symbols included in one check data may be carried in one check data packet. For example, the source data payload included in the first source data (that is, the source data payload filled in the data areas D of the source data symbol 1 in the first row and the source data symbol 2 in the second row) in FIG. 2 is carried in one source data packet for being sent. Definitely, multiple source data payloads may also be carried in one source data packet, and multiple check data may also be carried in one check data packet, which is not limited here.

Step 11: When source data packets loss occurs, judge whether all of the lost source data payloads can be decoded by using the received source data payloads and the check data.

The determining that source data packets loss occurs may be as follows: the receiver generates a reconstructed data block by using the source data payloads carried in the received source data packets, if the reconstructed data block lacks some of the source data payloads, it is determined that source data packets loss occurs, and ESIs of the source data symbols corresponding to the lacked source data payloads (that is, the lost source data payloads) in the reconstructed data block may be further determined. Alternatively, when the sender sends the source data payloads by adopting the source data packets having continuous serial numbers, if the serial numbers of the source data packets received by the receiver are discontinuous, it is determined that source data packets loss occurs.

After the reconstructed data block is generated, the judging whether all of the lost source data payloads can be decoded by using the received source data payloads and the check data may be as follows. When the number of the source data symbols corresponding to the lost source data payloads is greater than the number of the received check data symbols, it is judged that all of the lost source data payloads cannot be decoded by using the received source data payloads and the check data symbols. On the contrary, when the number of the source data symbols corresponding to the lost source data payloads is less than or equal to the number of the received check data symbols, it is judged that all of the lost source data payloads can be decoded. Alternatively, when forward error correction decoding is performed by using the source data symbols corresponding to the received source data payloads and the check data symbols, if all of the source data symbols corresponding to the lost source data payloads can be decoded, it is judged that all of the lost source data payloads can be decoded by using the received source data payloads and the check data symbols. On the contrary, if all of the source data symbols corresponding to the lost source data payloads cannot be decoded, it is judged that all of the lost source data payloads cannot be decoded.

Figures 3, 4, 5A, 5B:
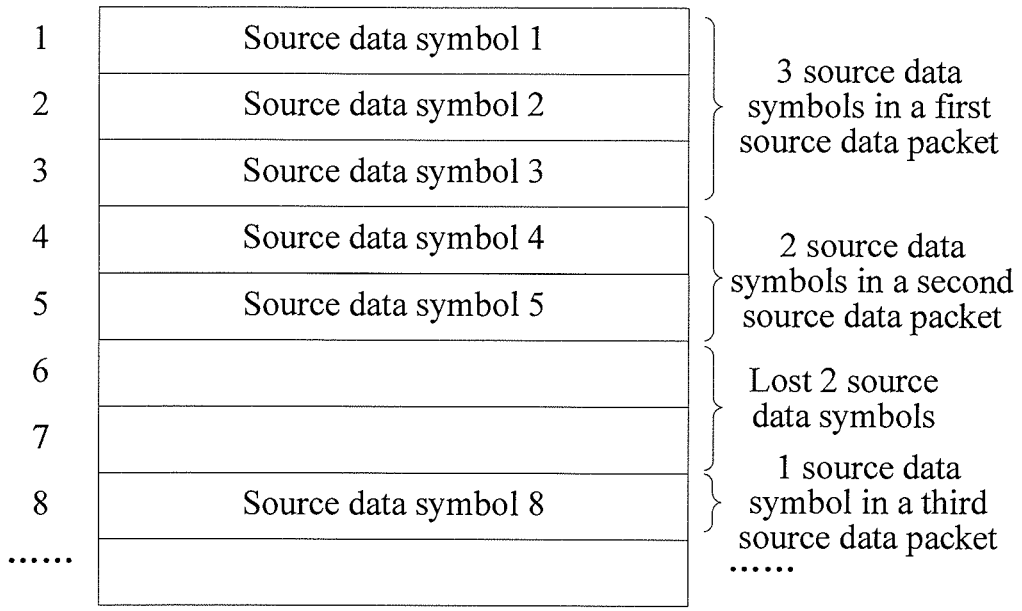

The reconstructed data block adopts the same structure with the source data block, and is also a storage area formed by multiple symbols. Referring to FIG. 3, the reconstructed data block includes the storage space of multiple symbols. The storage space of each symbol may have one source data symbol or one check data symbol written in, and one source data or one check data may occupy the storage space of one or more symbols. The storage space of each symbol corresponds to one ESI, that is, each ESI designates one position in the reconstructed data block. The receiver generating the reconstructed data block by using the source data payloads carried in the received source data packets may be as follows. According to the ESI of the first source data symbol in the source data symbols corresponding to the received source data payloads, each source data payload is filled into the reconstructed data block by using the position designated by the ESI of the first source data symbol corresponding to the source data payload as a start position, so as to generate the reconstructed data block. Thereafter, the judging whether the reconstructed data block lacks a part of the source data payloads is as follows. If symbols being null exist among the source data in the reconstructed data block, it is judged that the reconstructed data block lacks a part of the source data payloads; or, if a total length of the source data in the reconstructed data block is less than a total length of the source data in the source data block, it is judged that the reconstructed data block lacks apart of the source data payloads; or, if symbols being null exist in the last of the reconstructed data block, it is judged that the reconstructed data block lacks a part of the source data payloads. The total length of the source data in the source data block may be represented by the number of the source data symbols in the source data block or byte numbers of the source data in the source data block, may be transmitted to the receiver through data packets, or agreed by the sender and the receiver, or determined by a forward error correction scheme.

How to determine the ESIs of the source data symbols corresponding to the lacked source data payloads (that is, the lost source data payloads) in the reconstructed data block is illustrated in the following by examples. For example, the sender sends four source data packets, while the receiver only receives three source data packets. The ESI of the first source data symbol corresponding to the source data payload carried in the first source data packet is 1; the ESI of the first source data symbol corresponding to the source data payload carried in the second source data packet is 4; and the ESI of the first source data symbol corresponding to the source data payload carried in the third source data packet is 8. According to the ESI (the ESI is 1) of the first source data symbol corresponding to the source data payload carried in the received first source data packet, the receiver fills one source data payload in the first source data packet in the storage space corresponding to the symbol 1, symbol 2, and symbol 3 of the reconstructed data block by using the symbol 1 as the start position, referring to FIG. 3. Similarly, one source data payload in the second source data packet is filled in the storage space corresponding to the symbol 4 and symbol 5 of the reconstructed data block, and one source data payload in the third source data packet is filled in the storage space corresponding to the symbol 8. Finally the reconstructed data block as shown in FIG. 3 is generated. The storage space corresponding to symbols having the ESIs being 6 and 7 are empty (that is, the reconstructed data block lacks the source data symbol 6 and the source data symbol 7), which indicates that the source data payloads corresponding to the source data symbol 6 and the source data symbol 7 are lost during transmission, and the receiver cannot receive the source data payloads corresponding to the source data symbol 6 and the source data symbol 7. In addition, if the last one or more source data payloads of the source data block are lost during transmission, the lacked last source data symbols in the reconstructed data block may be determined according to the total length of the source data in the source data block. For example, in the reconstructed data block shown in FIG. 3, if the total length of the source data in the source data block is 8 symbols, the last source data symbol in the reconstructed data block is not lacked, and the reconstructed data block only lacks the source data symbol 6 and the source data symbol 7. If the total length of the source data in the source data block is 9 symbols, the reconstructed data block lacks the last source data symbol 9, so the reconstructed data block totally lacks the source data symbol 6, the source data symbol 7, and the source data symbol 9. Alternatively, if the last one or more source data payloads of the source data block are lost during transmission, the lacked last source data symbol in the reconstructed data block may be determined according to the ESI of the last source data symbol in the source data block, where the ESI of the last source data symbol in the source data block may be transmitted by the sender to the receiver through a data packet, or when the check data symbols and the source data symbols adopt the sequential ESI numbering rule, the ESI of the last source data symbol may be obtained by subtracting a number step from the ESI of the first check data symbol. For example, in the reconstructed data block shown in FIG. 3, if the ESI of the first check data symbol is 10, the ESI of the last source data symbol is 9. At this time, the storage position corresponding to the source data symbol having the ESI being 9 in the reconstructed data block is empty, and the last of the reconstructed data block has a symbol being null (the source data symbol 9), so that the last source data symbol 9 in the reconstructed data block is lacked, and the reconstructed data block totally lacks the source data symbol 6, the source data symbol 7, and the source data symbol 9.

The reconstruction of the data block corresponding to the check data (that is, the check data block) may be similar to the generation of the reconstructed data block of the source data, and the determining the lacked check data in the data block corresponding to the check data may adopt the similar manner for determining the lost source data symbols. For example, according to the ESIs of the received check data symbols, each check data symbols is filled in a position designated by the ESI in the data block corresponding to the check data, thereby generating the data block corresponding to the check data. Alternatively, according to the ESI of the first check data symbol in each received check data packet, one or more check data symbols in each check data packet are sequentially filled in the data block corresponding to the check data by using a position designated by the ESI of the first check data symbol in the check data packet as a start position, thereby generating the data block corresponding to the check data. The data block corresponding to the check data may be a block different from the reconstructed data block of the source data. The two are independent from each other, and each adopts an independent ESI numbering rule. Alternatively, the data block corresponding to the check data may be a part of the reconstructed data block of the source data, for example, in the reconstructed data block shown in FIG. 2, the check data symbols and the source data symbols adopt a sequential ESI numbering rule.

The receiver and the sender have a same forward error correction scheme (forward error correction Scheme), and the forward error correction scheme is a specific standard for forward error correction. The forward error correction scheme is used for performing forward error correction encoding and decoding, and the forward error correction scheme may be represented by a matrix or a vector group. One row or one column in the matrix corresponds to a check data, and this row or column represents the generation manner of the corresponding check data. Alternatively, one row vector or one column vector in the vector group corresponds to a check data, and this row vector or column vector represents the generation manner of the corresponding check data. Referring to FIG. 4, a schematic diagram of a forward error correction scheme represented in a matrix form is shown. One row in the forward error correction scheme matrix corresponds to one check data, and totally 3 check data exist. The source data block totally has 9 source data symbols, where each source data symbol corresponds to one column in the forward error correction scheme matrix (FIG. 4 marks the ESI numbers of the source data symbols corresponding to each column of the forward error correction scheme matrix), and elements in the matrix each represent whether the source data symbol corresponding to the element is adopted to generate the check data corresponding to the element. In the forward error correction scheme matrix in FIG. 4, it is assumed that the value of the element being 1 represents that the source data symbol corresponding to the element is adopted to generate the check data corresponding to the element, and the value of element being 0 represents that the source data symbol corresponding to the element is not adopted to generate the check data corresponding to the element. For example, the element value in the first column of the third row in the forward error correction scheme matrix is 1, it represents that the third check data is generated by adopting the first source data symbol (that is, the source data symbol 1), and by comprehensively viewing all the elements in the third row, it can be seen that, the third check data is generated by performing forward error correction encoding adopting the source data symbol 1, the source data symbol 2, and the source data symbol 8. Definitely, it may be understood that, the value of the element is not limited to 0 or 1, and any two different values or symbols may be used to represent whether the source data symbol corresponding to the element is adopted to generate the check data corresponding to the element. When the forward error correction scheme is in the form of a matrix and each source data symbol corresponds to one column of the forward error correction scheme matrix, the number of the source data symbols in the source data block is equal to the number of columns in the forward error correction scheme matrix. Alternatively, when the forward error correction scheme is in the form of a matrix and each source data symbol corresponds to one row of the forward error correction scheme matrix, the number of the source data symbols in the source data block is equal to the number of rows in the forward error correction scheme matrix. Alternatively, when the forward error correction scheme is in the form of a column vector group (that is, each column vector corresponds to one check data) and each source data symbol corresponds to one element at the same position with each column vector in the forward error correction scheme column vector group, the number of the source data symbols in the source data block is equal to the number of dimensions of each column vector in the column vector group. Alternatively, when the forward error correction scheme is in the form of a row vector group (that is, each row vector corresponds to one check data) and each source data symbol corresponds to one element at the same position with each row vector in the forward error correction scheme row vector group, the number of the source data symbols in the source data block is equal to the number of dimensions of each row vector in the row vector group. For example, referring to FIG. 4, each source data symbol corresponds to one column of the matrix and the number of columns in the forward error correction scheme matrix is 9, then the number of the source data symbols in the source data block is 9, that is, the source data block has 9 source data symbols, and the ESIs of the 9 source data symbols is from 1 to 9. At this time, by taking the reconstructed data block in FIG. 3 as an example, the ESIs of the source data symbols existing in the reconstructed data block is 1 to 5, and 8, so the reconstructed data block totally lacks the source data symbol 6, the source data symbol 7, and the source data symbol 9.

Step 12: If all of the lost source data payloads cannot be decoded, determine source data symbols needed for decoding all of the lost source data payloads by using the received source data payloads and the check data; where the needed source data symbols may be represented by corresponding ESIs.

The determining the source data symbols needed for decoding all of the lost source data payloads by using the received source data payloads and the check data may be as follows. After the reconstructed data block is generated, decode a part of the source data symbols corresponding to the lost source data payloads (briefly referred to as lost source data symbols hereinafter) through forward error correction by adopting the source data symbols corresponding to the received source data payloads (briefly referred to as received source data symbols hereinafter) and the received check data symbols. The decoded source data symbols are referred to as restored source data symbols, and the source data symbols other than the restored source data symbols in the lost source data symbols are used as the source data symbols needed for decoding all of the lost source data payloads, where the needed source data symbols cannot be restored through forward error correction by adopting the received source data symbols and the check data symbols. Alternatively, determine the lost source data symbols by adopting the received source data symbols, determine a minimum set of repairing source data symbols by using the forward error correction scheme corresponding to the received check data symbols and the lost source data symbols, and use the minimum set of repairing source data symbols as the source data symbols needed for decoding all of the lost source data payloads. It should be noted that, in most situations, the needed source data symbols are a part of the lost source data symbols; and in very rare situations, for example, the received check data symbols completely cannot be used to decode the lost source data symbols (that is, the received check data symbols and the lost source data symbols have no check relations), which may cause that the needed source data symbols are all of the lost source data symbols. However, this situation has an extremely tiny probability, and thus may be ignored, so the technical solution of the present invention has universality and commonality.

Take the reconstructed data block in FIG. 3 and the forward error correction scheme in FIG. 4 as examples, it is assumed that the lost source data symbols are the source data symbol 6, the source data symbol 7, and the source data symbol 9, where each check data packet includes one check data symbol, and the three check data are respectively the check data symbol 1, the check data symbol 2, and the check data symbol 3. Therefore, the determining the minimum set of repairing source data symbols through the forward error correction scheme corresponding to the received check data symbols and the lost source data symbols may be as follows. When the receiver receives all of the three check data, the first row to the third row of the forward error correction scheme matrix (that is, the three rows corresponding to the check data symbol 1, the check data symbol 2, and the check data symbol 3) are all valid, and elements in the sixth, the seventh, and the ninth columns (that is, the three columns corresponding to the source data symbol 6, the source data symbol 7, and the source data symbol 9) in the first to third rows are extracted, so as to form a loss matrix A shown in FIG. 5a (FIG. 5a to FIG. 5d mark the ESI numbers of the source data symbols corresponding to each column of the loss matrix A), where the loss matrix A is used to represent correspondence of the received check data symbols and the lost source data symbols. Find out a maximum linear independence group of a row vector (vectors formed by intercepting a part of elements from the vectors corresponding to the check data symbols 1, 2, and 3) group of the loss matrix A, that is, row vectors (0 1 1) and (1 1 0). The rank of the maximum linear independence group is 2, and therefore, one (obtained by subtracting the rank 2 of the maximum linear independence group from the dimensions 3 of the vector) vector is further needed to form a full rank matrix. On the basis of finding out the maximum linear independence group of the row vector group of the loss matrix A, a unit row vector is added to generate a full rank matrix B. Here, the reason of adding the unit vector is that the unit vector is the simplest, and definitely, a non-unit vector may also be adopted, which is not limited in the present invention. Three unit row vectors exist in the three dimensions, namely, (1 0 0), (0 1 0), and (0 0 1), so one of the three unit row vector may be selected randomly or sequentially to be combined with the maximum linear independence group to generate a three-degree matrix. Judge whether the generated three-degree matrix has full rank. One or more source data symbols corresponding to the added element having the unit vector value being 1 in the full rank matrix B are the minimum set of repairing source data symbols. Finally, three types of full rank matrix B may be generated, respectively shown in FIG. 5b, FIG. 5c, and FIG. 5d. When the full rank matrix B shown in FIG. 5b is generated, the minimum set of repairing source data symbols is the source data symbol 6 (that is, the source data symbol corresponding to the element having the value of the row vector (1 0 0) being 1). Similarly, when the full rank matrix B shown in FIG. 5c is generated, the minimum set of repairing source data symbols is the source data symbol 7, and when the full rank matrix B shown in FIG. 5d is generated, the minimum set of repairing source data symbols is the source data symbol 9. In addition, in the process of determining the minimum set of repairing source data symbols through the forward error correction scheme corresponding to the received check data symbols and the lost source data symbols, if the receiver only receives a part of the check data, for example, only receives the check data symbol 1 and the check data symbol 3, the first row and the third row (that is, the two rows corresponding to the check data symbol 1 and the check data symbol 3) in the forward error correction scheme matrix are valid, and at this time, a loss matrix A' shown in FIG. 5e is formed. Thereafter, find out a maximum linear independence group of a row vector group of the loss matrix A'.

In addition, the determining the minimum set of repairing source data symbols through the forward error correction scheme corresponding to the received check data symbols and the lost source data symbols may be as follows. Progressively add the lost source data symbols in the forward error correction scheme, and use the corresponding least lost source data symbols progressively added when the forward error correction scheme matrix is solvable as the minimum set of repairing source data symbols. The progressively adding the lost source data symbols in the forward error correction scheme may specifically is as follows. First, add any one of the lost source data symbols in the forward error correction scheme (that is, it is assumed that any one of the lost source data symbols is received); judge whether the forward error correction scheme matrix is solvable when adding one lost source data symbol (that is, it is assumed that when one of the lost source data symbols is received, whether all of the lost source data symbols can be restored by adopting the actually received source data symbols, the received check data symbols, and the assumed received one of the lost source data symbols); if the forward error correction scheme matrix is solvable, use the corresponding one newly added lost source data symbol when the forward error correction scheme matrix is solvable as the minimum set of restoring data symbols; if the forward error correction is not solvable no matter which lost source data symbol is added, add any two of the lost source data symbols in the forward error correction scheme (that is, it is assumed that any two of the lost source data symbols are received); then, judge whether the forward error correction scheme matrix is solvable when adding two lost source data symbols; if the forward error correction scheme matrix is solvable, use the corresponding two newly added lost source data symbols when the forward error correction scheme matrix is solvable as the minimum set of restoring data symbols; if the forward error correction is not solvable no matter which two lost source data symbols are added, continue to increase the number of the lost source data symbols added in the forward error correction scheme, and the rest may be deduced by analog. For example, take the reconstructed data block in FIG. 3 and the forward error correction scheme in FIG. 4 as examples, it is assumed that the lost source data symbols are the source data symbol 6, the source data symbol 7, and the source data symbol 9, and the received three check data symbols are the check data symbol 1, the check data symbol 2, and the check data symbol 3. First, the source data symbol 6, the source data symbol 7, and the source data symbol 9 are respectively added in the forward error correction scheme, and it may be judged that the forward error correction matrix is solvable when any one of the source data symbol 6, the source data symbol 7, and the source data symbol 9 is added in the forward error correction scheme, so the minimum set of repairing source data symbols may be any one of the source data symbol 6, the source data symbol 7, and the source data symbol 9.

Step 13: Request for retransmitting all or part of the needed source data symbols.

After determining the source data symbols needed for decoding all of the lost source data symbols in the step 12, the receiver requesting for retransmitting the needed source data symbols may be as follows. Request for retransmitting all of the needed source data symbols, or request for retransmitting a part of the needed source data symbols, for example, only request for retransmitting the part of source data symbols corresponding to important data in the needed source data symbols, where the important data may be I frame data in a video stream. The receiver may send a retransmission request to a retransmission device (the retransmission device may be a retransmission server or another network node having the function of responding a retransmission request), so as to obtain all or part of the needed source data symbols. Thereafter, the receiver may perform forward error correction decoding according to the received source data symbols, the received check data symbols, and the received retransmitted needed source data symbols, and decode all or part of the important lost source data symbols, so as to obtain needed source data. When requesting for retransmission, a format of the retransmission request message may be the form shown in FIG. 6, where SBN represents the source data block number of the encoding symbols to be retransmitted; ESC (encoding symbol count, encoding symbol count) represents the count of the encoding symbols to be retransmitted; ESI represents the encoding symbol IDs of the encoding symbols to be retransmitted. One retransmission request may include one or more ESIs (ESI1, ESI2, . . . , ESIn in FIG. 6), and padding is a padding bit.

When the retransmission device sends the data symbols requesting for retransmission after receiving the retransmission request, various flexible manners may be adopted. The retransmission device sends the encoding symbols requesting for retransmission to the receiver once or multiple times. Alternatively, the retransmission device performs forward error correction encoding on the encoding symbols requesting for retransmission, generates new check data, and sends the encoding symbols requesting for retransmission and the new check data. In this way, even some of the encoding symbols requesting for retransmission are lost when being sent to the receiver, the receiver may restore the lost encoding symbols requesting for retransmission according to the new check data.

In this embodiment, when all of the lost source data payloads cannot be decoded by using the received source data payloads and the check data, determine the source data symbols needed for decoding all of the lost source data payloads by using the received source data payloads and the check data, and request for retransmitting all or part of the needed source data symbols. Therefore, according to the technical solution provided in the embodiment of the present invention, the source data payloads and the check data in the data packets may be fully utilized, thereby improving the utilization rate of the data symbols and reducing the waste of data. Moreover, the needed source data symbols are generally less than the lost source data symbols, and therefore, only a part of the lost source data symbols are retransmitted when retransmitting the needed source data symbols, thereby reducing the overhead of the bandwidth.

Embodiment 2

Figures 7, 8A:
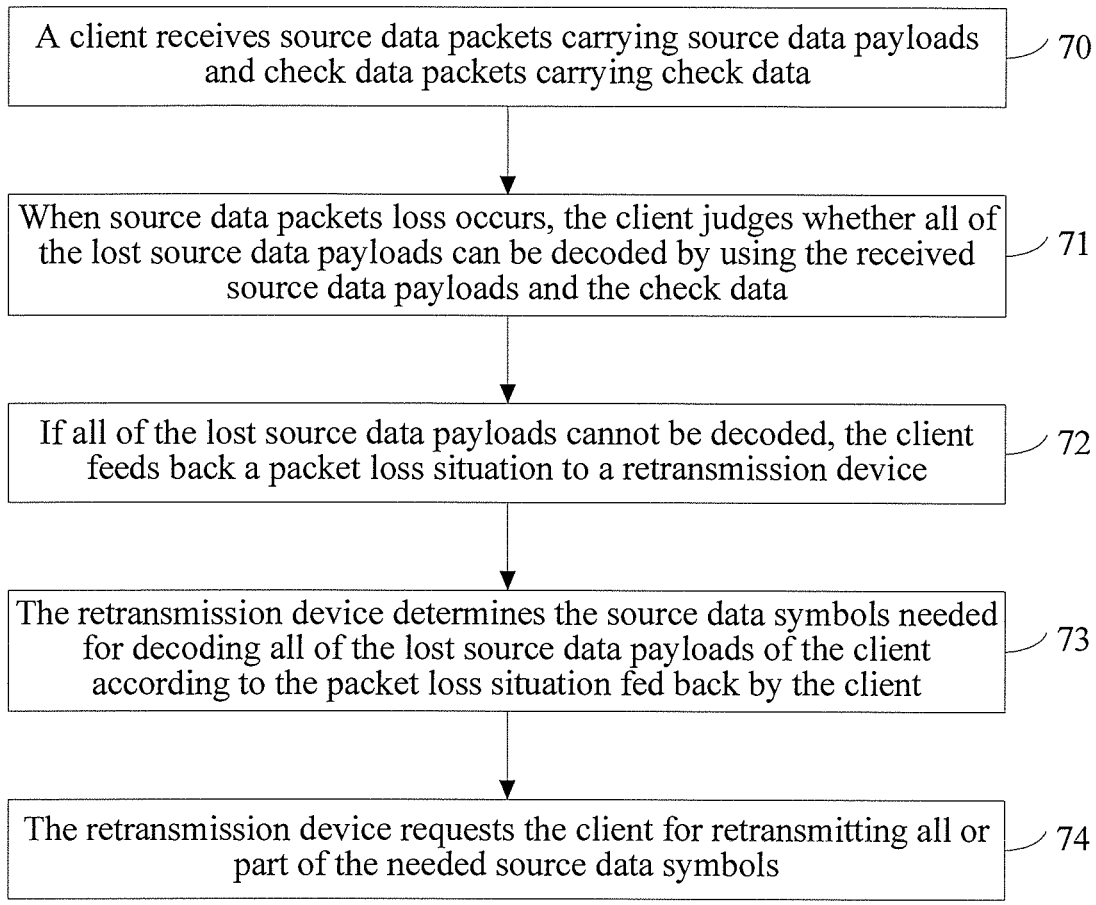
FIG. 7 is a flow chart of a method for retransmission based on forward error correction according to Embodiment 2 of the present invention.
FIG. 8a is a schematic diagram of an NACK format in the method according to Embodiment 2 of the present invention.

As shown in FIG. 7, an embodiment of the present invention provides another method for retransmission based on forward error correction, and the method includes the following steps.

Step 70: A client receives source data packets carrying source data payloads and check data packets carrying check data, where one source data packet may carry one or more source data payload, and one check data packet may carry one or more check data.

Step 71: When source data packets loss occurs, the client judges whether all of lost source data payloads can be decoded by using the received source data payloads and the check data.

Step 72: If all of the lost source data payloads cannot be decoded, the client feeds back a packet loss situation to a retransmission device.

In the step 72, the client feeding back the packet loss situation to the retransmission device may be: feeding back, by the client, packet loss situation corresponding to the source data, and packet loss situation corresponding to the check data. The packet loss situation corresponding to the source data may be represented by: serial numbers of the source data packets received by the client, serial numbers of the source data packet lost by the client, ESIs of the source data symbols received by the client, or ESIs of the source data symbols lost by the client. The packet loss situation corresponding to the check data may be represented by: serial numbers of the check data packets received by the client, serial numbers of the check data packet lost by the client, ESIs of the check data symbols received by the client, or ESIs of the check data symbols lost by the client. The ESIs of the source data symbols received or lost by the client and the ESIs of the check data symbols received or lost by the client may be determined by a reconstructed data block. After the reconstructed data block is generated, the source data symbols or check data symbols existing in the reconstructed data block are the source data symbols or check data symbols received by the client, and the lacked source data symbols or check data symbols in the reconstructed data block are the source data symbols or check data symbols lost by the client. The source data symbols or check data symbols may be represented by ESIs corresponding to the symbols.

When the client feeds back the packet loss situation to the retransmission device, the client may directly feedback which symbols (the source data symbols and the check data symbols) are already received, and may also feedback which symbols are lacked through NACK. The NACK (Negative ACKnowledgment, negative acknowledgment) is taken as an example in the following. Referring to FIG. 8*a*, Type: 1 byte, represents the message type; SBN: 2 bytes, represents the packet loss situation of which source data block is feedback; IsSrc: 1 byte, 1 represents the source data, and 0 represents the check data; startEsi: 2 bytes, represents a start ESI of the lost symbols; count: 2 bytes, represents the count of the continuous lost symbols start from the startEsi. A triple formed by the isSrc, startEsi, and count may appear several times in the message, and is used to represent the lost situation of the source data or the check data. In addition, when the client feeds back the packet loss situation to the retransmission device, a RTCP (Real-time Transport Control Protocol, real-time transport control protocol) extended message may be adopted to feed back the packet loss situation. A general format of the extended message may be shown in FIG. 8*b*, where report blocks is used to feedback the packet loss situation. For a specific format of the report blocks, reference can be made to FIG. 8*c*, where type-specific: 0 by default; block length: represents the size of the report blocks; SBN: represents the SBNs of the lost symbols; srcCount: represents how many pairs (begin_Src_ESI, src_count) exist in the message, where one of the pairs represents the loss of a section of continuous symbols in the source block; RbCount: represents how many pairs (begin_Rb_ESI, rb_count) exist in the message, where one of the pairs represents the loss of a section of continuous symbols in the check block; begin_Src_ESI: the ESI of the first symbol in the section of continuous lost symbols in the source data block; src_count: the count of the section of continuous lost symbols in the source data block; begin_Rb_ESI: the ESI of the first symbol in the section of continuous lost symbols in the check data block; and rb_count: the count of continuous lost symbols in the check data block.

Step 73: The retransmission device determines the source data symbols needed for decoding all of the lost source data payloads of the client according to the packet loss situation fed back by the client, where the needed source data symbols may be represented by corresponding ESIs.

The retransmission device is saved with all of the source data packets in a period of time, and all of the check data packets in the period time, and therefore, when receiving the packet loss situation fed back by the client, as long as the retransmission device knows the serial numbers of the source data packets received by the client or the serial numbers of the source data packets lost by the client, the retransmission device may determine the serial numbers of the source data packets lost by the client or the serial numbers of the source data packets received by the client according to the serial numbers of all the source data packets. Thereafter, the retransmission device may generate a complete reconstructed data block without any lack by adopting the saved source data packets, and determine the source data symbols corresponding to the source data payloads in the source data packets lost by the client (that is, the lost source data symbols) and the source data symbols corresponding to the source data payloads in the source data packets received by the client (that is, the received source data symbols). Alternatively, the retransmission device is saved with all the source data packets in a period of time, so the retransmission device may generate a complete reconstructed data block without any lack by adopting the source data packets, so as to obtain the ESIs of the source data symbols of all the source data packets. Therefore, as long as the retransmission device knows the ESIs of the source data symbols received by the client or the ESIs of the source data symbols lost by the client, the retransmission device may determine the source data symbols lost by the client or the source data symbols received by the client according to the ESIs of the source data symbols in all the source data packets. The manner of determining the check data symbols lost by the client and the check data symbols received by the client is similar to the determining manner of the source data symbols, and details are not described here again.

Then, the retransmission device may determine the source data symbols needed for decoding all of the lost source data payloads of the client by using the source data symbols received by the client and the check data symbols received by the client. For the method for the retransmission device to determine the source data symbols needed for decoding all of the lost source data payloads by using the source data symbols received by the client and the check data symbols received by the client, reference can be made to related contents in step 12 of Embodiment 1, and details are not described here again.

Step 74: The retransmission device requests the client for retransmitting all or part of the needed source data symbols.

In the step 74, when the retransmission device sends all or part of the needed source data symbols, various flexible manners may be adopted. The retransmission device sends all or part of the needed source data symbols to the client once or multiple times. Alternatively, the retransmission device performs forward error correction encoding on all or part of the needed source data symbols, generates new check data, and sends all or part of the needed source data symbols and the new check data to the client. In this way, even some of the needed source data symbols sent by the retransmission device are lost when being sent to the client. The client may also restore the needed source data symbols according to the new check data.

For the steps in this embodiment similar to those in Embodiment 1, reference can be made to related contents in Embodiment 1.

In this embodiment, when the client cannot decode all of the lost source data payloads by using the received source data payloads and the check data, the client feeds back a packet loss situation to the retransmission device, and thereafter, the retransmission device determines the source data symbols needed for decoding all of the lost source data payloads by using the source data payloads and the check data received by the client, and sends all or part of the needed source data symbols to the client. Therefore, according to the technical solution provided in the embodiment of the present invention, the source data payloads and the check data in the data packets may be fully utilized, thereby improving the utilization rate of the data symbols and reducing the waste of data. Moreover, the needed source data symbols are generally less than the lost source data symbols, and therefore, only a part of the lost source data symbols are retransmitted when sending the needed source data symbols, thereby reducing the overhead of the bandwidth. In addition, the needed source data symbols are determined by the retransmission server, so the client only needs to feedback the packet loss situation. Therefore, the technical solution of this embodiment of the present invention is compatible with the conventional client, and only the retransmission device needs to be upgraded, thereby improving the compatibility of the system.

Embodiment 3

Figure 9A:
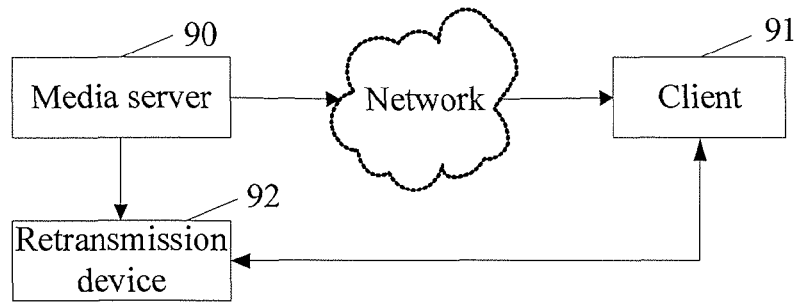
FIG. 9a is a schematic structure diagram of a communication system according to Embodiment 3 of the present invention.

Referring to FIG. 9a, this embodiment provides a communication system, where the system is capable of completing retransmission based on forward error correction, and the system includes:

a media server 90, configured to send source data packets carrying source data payloads and check data packets carrying check data to a client 91; send source data packets carrying source data payloads to a retransmission device 92, or send source data packets carrying source data payloads and check data packets carrying check data to the retransmission device 92;

the client 91, configured to receive the source data packets carrying the source data payloads and the check data packets carrying the check data; judge whether all of the lost source data payloads can be decoded by using the received source data payloads and the check data, when source data packets loss occurs; if all of the lost source data payloads cannot be decoded, determine source data symbols needed for decoding all of the lost source data payloads by using the received source data payloads and the check data; and request the retransmission device 92 for retransmitting all or part of the needed source data; and the retransmission device 92, configured to buffer all source data packets in a period of time; and send all or part of the needed source data symbols to the client 91 according to the request of the client 91 for retransmitting all or part of the needed source data symbols.

When requesting for retransmission, the client 91 may use all or part of the needed source data symbols as the source data symbols to be retransmitted, carry the ESIs of the source data symbols to be retransmitted in a retransmission request message and send the ESIs of the source data symbols to be transmitted carried in the retransmission request message to the retransmission device 92. After receiving the retransmission request message, the retransmission device 92, according to the ESIs of the source data symbols to be retransmitted, sends the source data symbols corresponding to the ESIs of the source data symbols to be retransmitted to the client 91.

Figure 9B:
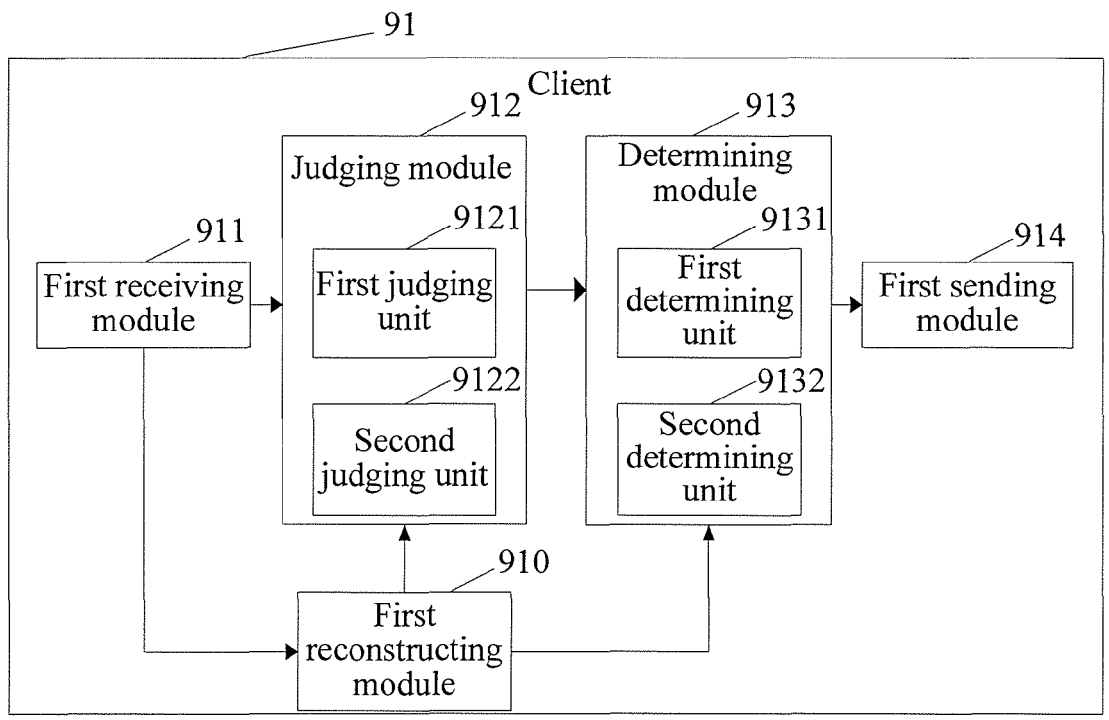
FIG. 9b is a schematic structure diagram of a client in the communication system according to Embodiment 3 of the present invention.

As shown in FIG. 9b, the client 91 may include: a first receiving module 911, configured to receive the source data packets carrying the source data payloads and the check data packets carrying the check data; a judging module 912, configured to, when source data packets loss occurs, judge whether all of the lost source data payloads can be decoded by using the received source data payloads and the check data; a determining module 913, configured to, if all of the lost source data payloads cannot be decoded, determine source data symbols needed for decoding all of the lost source data payloads by using the received source data payloads and the check data; and a first sending module 914, configured to send the retransmission request message to the retransmission device 92, and request for retransmitting all or part of the needed source data. The client 91 may further include: a first reconstructing module 910, configured to generate a reconstructed data block by using the source data payloads carried in the received source data packets.

The judging module 912 may further include: a first judging unit 9121, configured to, when the number of the source data symbols corresponding to the lost source data payloads (briefly referred to as lost source data symbols hereinafter) is greater than the number of the received check data symbols, judge that all of the lost source data payloads cannot be decoded by using the received source data payloads and the check data symbols; and when the number of the lost source data symbols is less than or equal to the number of the received check data symbols, judge that all of the lost source data payloads can be decoded; and/or a second judging unit 9122, configured to perform forward error correction decoding by using the received source data symbols corresponding to the received source data payloads (briefly referred to as received source data symbols hereafter) and the check data symbols; if all the source data symbols corresponding to the lost source data payloads can be decoded, judge that all of the lost source data payloads can be decoded by using the received source data payloads and the check data symbols; and if all the source data symbols corresponding to the lost source data payloads cannot be decoded, judge that all of the lost source data payloads cannot be decoded.

The determining module 913 may further include: a first determining unit 9131, configured to, after a reconstructed data block is generated, decode a part of the lost source data symbols through forward error correction by using the received source data symbols and the received check data symbols, use the un-decoded lost source data symbols as the source data symbols needed for decoding all of the lost source data payloads; and/or a second determining unit 9132, configured to determine the lost source data symbols by using the received source data symbols, determine a minimum set of repairing source data symbols through a forward error correction scheme corresponding to the received check data symbols and the lost source data symbols, and use the minimum set of repairing source data symbols as the source data symbols needed for decoding all of the lost source data payloads.

Figure 9C:
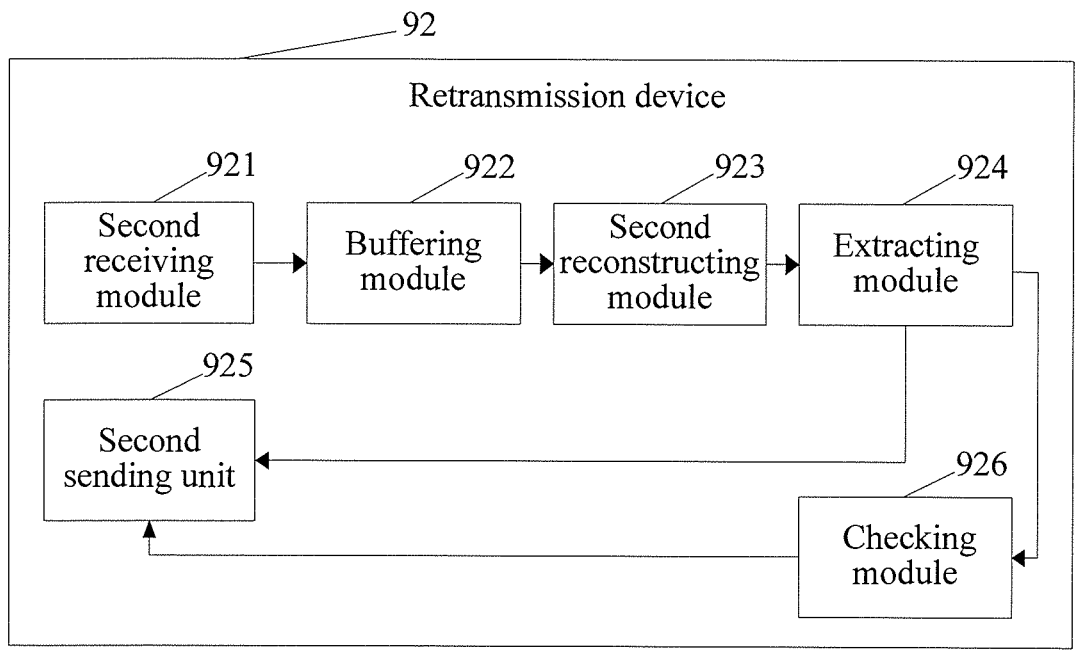
FIG. 9c is a schematic structure diagram of a retransmission device in the communication system according to Embodiment 3 of the present invention.

As shown in FIG. 9c, the retransmission device 92 may include: a second receiving module 921, configured to receive the retransmission request message sent by the client 91, where the retransmission request message carries the ESIs of the source data symbols to be retransmitted determined by the client 91; a buffering module 922, configured to buffer all the source data packets in a period of time; a second reconstructing module 923, configured to generate a reconstructed data block by using the source data payloads carried in all of the source data packets buffered in the period of time; an extracting module 924, configured to extract the source data symbols to be retransmitted from the reconstructed data block according to the ESIs of the source data symbols to be retransmitted; and a second sending module 925, configured to send the extracted source data symbols to be retransmitted to the client 91.

The retransmission device 92 may further include: a checking module 926, configured to perform forward error correction encoding on the extracted source data symbols to be retransmitted, so as to generate corresponding check data. At this time, the second sending module 925 is further configured to send the generated corresponding check data to the client 91.

The system in this embodiment is configured to perform the method for retransmission based on forward error correction according to Embodiment 1. For the implementations of the devices of the system in this embodiment and the functions of the modules of each device, reference can be made to related contents in Embodiment 1, and details are not described here again.

In this embodiment, when the client cannot decode all of the lost source data payloads by using the received source data payloads and the check data, the client determines the source data symbols needed for decoding all of the lost source data payloads by using the received source data payloads and the check data, and requests the retransmission device for retransmitting all or part of the needed source data symbols. Therefore, according to the technical solution provided in the embodiment of the present invention, the source data payloads and the check data in the data packets may be fully utilized, thereby improving the utilization rate of the data symbols and reducing the waste of data. Moreover, the needed source data symbols are generally less than the lost source data symbols, and therefore, only a part of the lost source data symbols are retransmitted when retransmitting the needed source data symbols, thereby reducing the overhead of the bandwidth.

Embodiment 4

Figure 10A:
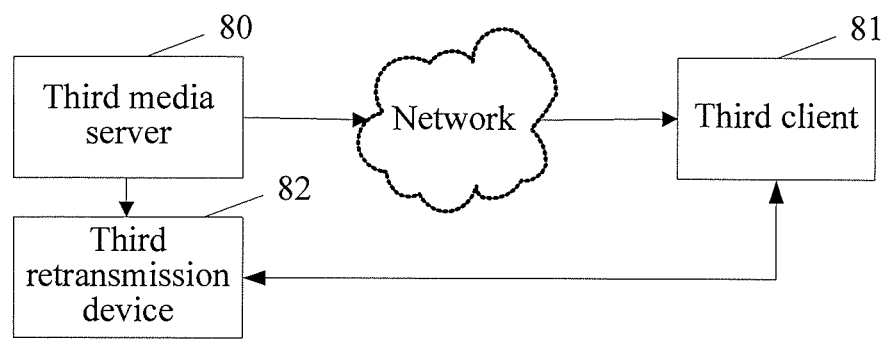
FIG. 10a is a schematic structure diagram of a communication system according to Embodiment 4 of the present invention.

Referring to FIG. 10a, this embodiment provides another communication system, where the system is capable of completing retransmission based on forward error correction, and the system includes:

a third media server 80, configured to send source data packets carrying source data payloads and check data packets carrying check data to a third client 81; and send the source data packets carrying the source data payloads and the check data packets carrying the check data to a third retransmission device 82;

a third client 81, configured to receive the source data packets carrying the source data payloads and the check data packets carrying the check data; when source data packets loss occurs, judge whether all of the lost source data payloads can be decoded by using the received source data payloads and the check data; and if all of the lost source data payloads cannot be decoded, feed back a packet loss situation to the retransmission device 82; and a third retransmission device 82, configured to buffer all the source data packets and the check data packets in a period of time; determine the source data symbols needed for decoding all of the lost source data payloads; and send all or part of the needed source data symbols to the third client 81.

Figure 10B:
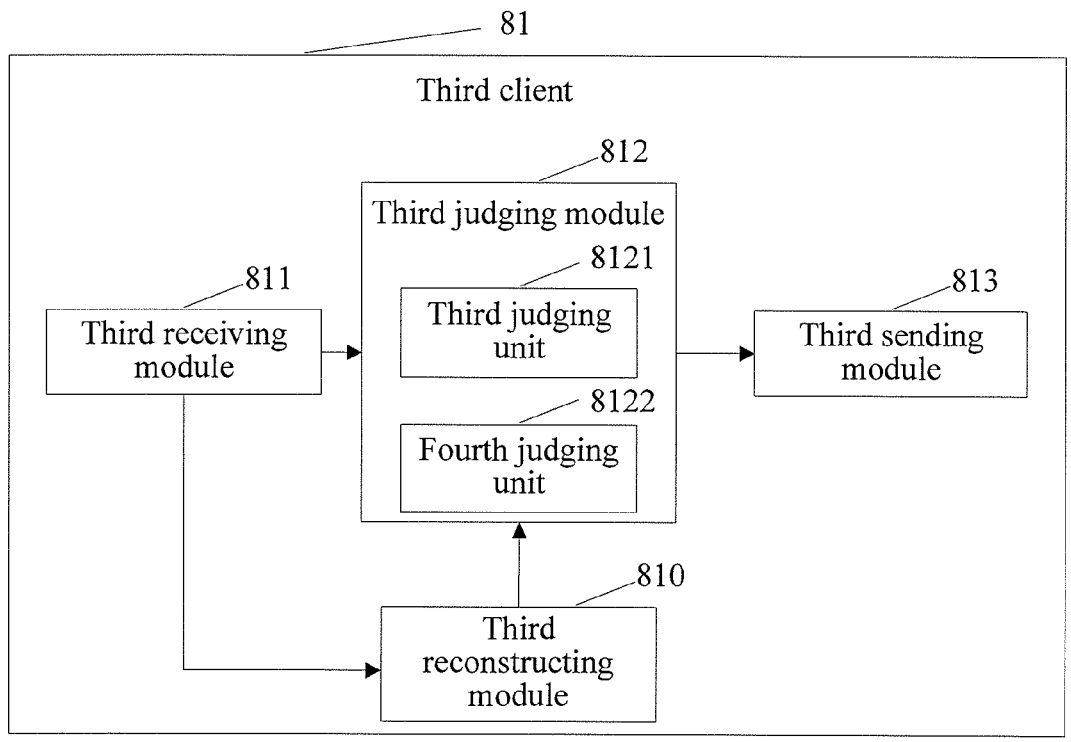
FIG. 10b is a schematic structure diagram of a third client in the communication system according to Embodiment 4 of the present invention.

As shown in FIG. 10b, the third client 81 may include: a third receiving module 811, configured to receive the source data packets carrying the source data payloads and the check data packets carrying the check data; a third judging module 812, configured to, when source data packets loss occurs, judge whether all of the lost source data payloads can be decoded by using the received source data payloads and the check data; and a third sending module 813, configured to, if all of the lost source data payloads cannot be decoded, feed back a packet loss situation to the retransmission device 82. The client 81 may further include: a third reconstructing module 810, configured to generate a reconstructed data block by using the source data payloads carried in the received source data packets.

The third judging module 812 may further include: a third judging unit 8121, configured to, when the number of the source data symbols corresponding to the lost source data payloads (briefly referred to as lost source data symbols hereinafter) is greater than the number of the received check data symbols, judge that all of the lost source data payloads cannot be decoded by using the received source data payloads and the check data symbols; and when the number of the lost source data symbols is less than or equal to the number of the received check data symbols, judge that all of the lost source data payloads can be decoded; and/or a fourth judging unit 8122, configured to perform forward error correction decoding by using the received source data symbols corresponding to the received source data payloads (briefly referred to as received source data symbols hereafter) and the check data symbols; if all the source data symbols corresponding to the lost source data payloads can be decoded, judge that all of the lost source data payloads can be decoded by using the received source data payloads and the check data symbols; and on the contrary, if all the source data symbols corresponding to the lost source data payloads cannot be decoded, judge that all of the lost source data payloads cannot be decoded.

Figure 10C:
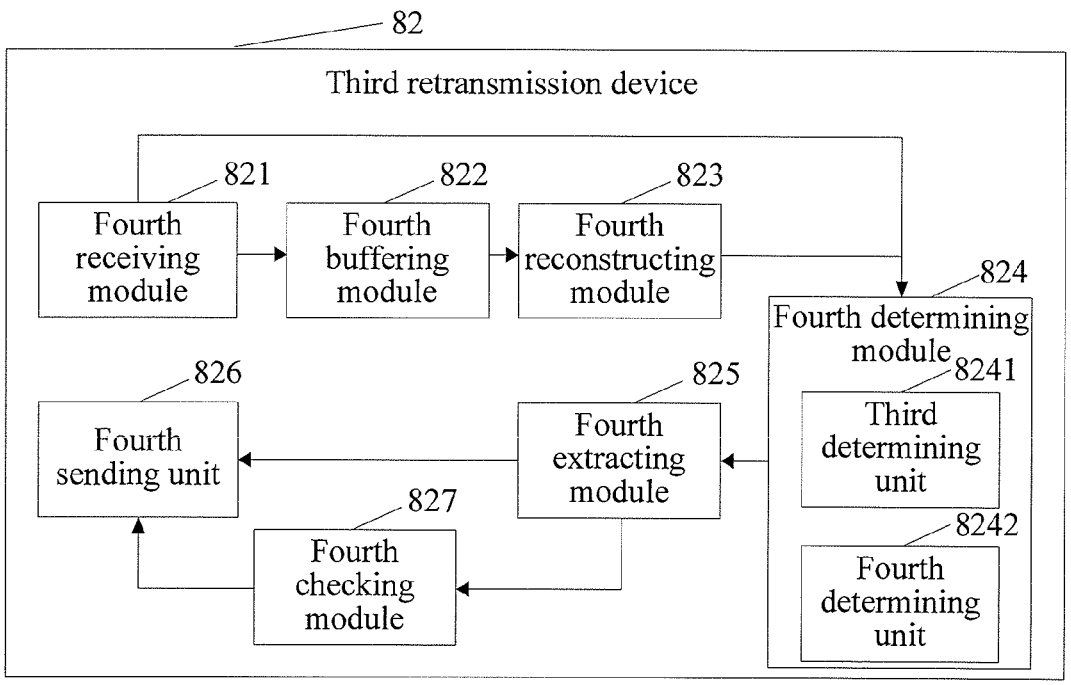
FIG. 10c is a schematic structure diagram of a third retransmission device in the communication system according to Embodiment 4 of the present invention.

As shown in FIG. 10c, the third retransmission device 82 may include: a fourth receiving module 821, configured to receive a feedback message carrying the packet loss situation of the third client 81 sent by the third client 81, where the feedback message carries packet loss packet corresponding to the source data and packet loss situation corresponding to the check data of the third client 81; a fourth determining module 824, configured to determine the source data symbols needed for decoding all of the lost source data payloads of the third client 81 according to the packet loss situation fed back by the third client 81; and a fourth sending module 826, configured to send all or part of the extracted needed source data symbols to the third client 81.

The third retransmission device 82 may further include: a fourth buffering module 822, configured to buffer all source data packets in a period of time; a fourth reconstructing module 823, configured to generate a reconstructed data block by using source data payloads carried in all of the source data packets buffered in the period of time; and a fourth extracting module 825, configured to extract the needed source data symbols from the reconstructed data block according to the ESIs of the needed source data symbols. After the source data symbols needed for decoding all of the lost source data payloads are determined, various manners may be used to obtain the needed source data symbols, which is not limited to the manner of extracting from the reconstructed data block. For example, the needed source data symbols may be obtained directly from the source data packets corresponding to the needed source data symbols.

The third retransmission device 82 may further include: a fourth checking module 827, configured to perform forward error correction encoding on the extracted needed source data symbols, so as to generate corresponding check data. At this time, the fourth sending module 826 is further configured to send the generated corresponding check data to the third client 81.

The fourth determining module 824 may further include: a third determining unit 8241, configured to, after a reconstructed data block is generated, determine the source data symbols received by the third client 81 and the check data symbols received by the third client 81 according to the packet loss situation fed back by the third client 81, decode a part of the lost source data symbols through forward error correction by using the source data symbols received by the third client 81 and the check data symbols received by the third client 81, and use the un-decoded lost source data symbols as the source data symbols needed for decoding all of the lost source data payloads; and/or, a fourth determining unit 8242, configured to determine the source data symbols lost by the third client 81 and the check data symbols received by the third client 81 according to the packet loss situation fed back by the third client 81, determine a minimum set of repairing source data symbols through a forward error correction scheme corresponding to the check data symbols received by the third client 81 and the lost source data symbols, and use the minimum set of repairing source data symbols as the source data symbols needed for decoding all of the lost source data payloads.

The system in this embodiment is configured to perform the method for retransmission based on forward error correction according to Embodiment 2. For the implementations of the devices of the system in this embodiment and the functions of the modules of each device, reference can be made to related contents in Embodiment 2, and details are not described here again.

In this embodiment, when the client cannot decode all of the lost source data payloads by using the received source data payloads and the check data, the client feeds back a packet loss situation to the retransmission device, and thereafter, the retransmission device determines the source data symbols needed for decoding all of the lost source data payloads by using the source data payloads and the check data received by the client, and sends all or part of the needed source data symbols to the client. Therefore, according to the technical solution provided in the embodiment of the present invention, the source data payloads and the check data in the data packets may be fully utilized, thereby improving the utilization rate of the data symbols and reducing the waste of data. Moreover, the needed source data symbols are generally less than the lost source data symbols, and therefore, only a part of the lost source data symbols are retransmitted when sending the needed source data symbols, thereby reducing the overhead of the bandwidth. In addition, the needed source data symbols are determined by the retransmission server, so the client only needs to feedback the packet loss situation. Therefore, the technical solution of this embodiment of the present invention is compatible with the conventional client, and only the retransmission device needs to be upgraded, thereby improving the compatibility of the system.

Persons of ordinary skill in the art may understand that all or part of the steps in the methods of the above embodiments may be implemented by related hardware instructed by a computer program, and the program may be stored in a computer readable storage medium, when the program is executed, the flow of the method embodiments are included. The storage medium may be a magnetic disk, an optical disk, a read-only memory (Read-only Memory, ROM), a random access memory (Random Access Memory, RAM), and the like.

In a word, the above descriptions are merely exemplary embodiments of the present invention, but not constructed as limitation to the present invention. Any modification, equivalent replacement, or improvement made without departing from the spirit and principle of the present invention should fall within the protection scope of the present invention.

What is claimed is:

1. A method for retransmission based on forward error correction, the method comprising:
   receiving source data packets carrying source data payloads and check data packets carrying check data;
   judging whether all of lost source data payloads can be decoded by using the received source data payloads and the check data, when the received source data packets loss occurs;
   determining needed source data symbols for decoding all of the lost source data payloads by using the received source data payloads and the check data if all of the lost source data payloads cannot be decoded; and
   requesting for retransmitting the needed source data symbols.

2. The method according to claim 1, wherein judging whether all of the lost source data payloads can be decoded by using the received source data payloads and the check data comprises:
   judging that all of the lost source data payloads cannot be decoded by using the received source data payloads and the check data symbols, when the number of lost source data symbols is greater than the number of received check data symbols;
   or, performing forward error correction decoding by using the received source data symbols and the received check data symbols; and if all of the lost source data symbols cannot be restored, judging that all of the lost source data payloads cannot be decoded by using the received source data payloads and the check data symbols.

3. The method according to claim 1, wherein a method for judging that source data packets loss occurs comprises:
   generating a reconstructed data block by using the source data payloads carried in the received source data packets; and if the reconstructed data block lacks source data symbols, judging that some of the source data packets are lost;
   or, if serial numbers of source data packets received by a receiver are discontinuous, judging that some of the source data packets are lost.

4. The method according to claim 1, wherein determining the source data symbols needed for decoding all of the lost source data payloads by using the received source data payloads and the check data symbols comprises:
   restoring a part of the lost source data symbols through forward error correction decoding by using the received source data symbols and the received check data symbols after the reconstructed data block is generated; and using the un-restored lost source data symbols as the source data symbols needed for decoding all of the lost source data payloads;
   or, determining lost source data symbols according to the received source data symbols;
   determining a minimum set of repairing source data symbols through a forward error correction scheme corresponding to the received check data symbols and the lost source data symbols; and using the minimum set of repairing source data symbols as the source data symbols needed for decoding all of the lost source data payloads.

5. The method according to claim 4, wherein determining the minimum set of repairing source data symbols by using the forward error correction scheme corresponding to the received check data symbols and the lost source data symbols comprises:
   obtaining elements corresponding to the received check data symbols and the lost source data symbols at the same time from a forward error correction scheme matrix; forming a loss matrix indicating loss situation of the source data symbols; determining a maximum linear independence group corresponding to the check data symbols in the loss matrix; generating a full rank matrix by combining the maximum linear independence group and unit vectors; and using the lost source data symbols corresponding to the unit vectors added when generating the full rank matrix as the minimum set of repairing source data symbols;
   or, progressively adding the lost source data symbols in the forward error correction scheme, and using the corresponding least lost source data symbols progressively added when the forward error correction matrix is solvable as the minimum set of repairing source data symbols.

6. The method according to claim 1, wherein requesting for retransmitting the needed source data symbols comprises:
   requesting for retransmitting all of the needed source data symbols;
   or, requesting for retransmitting a part of the source data symbols corresponding to important data in the needed source data symbols.

7. A client device, comprising:
   a first receiving module, configured to receive source data packets carrying source data payloads and check data packets carrying check data;
   a judging module, configured to judge whether all of the lost source data payloads can be decoded by using the received source data payloads and the check data, when source data packets loss occurs;
   a determining module, configured to determine source data symbols needed for decoding all of the lost source data payloads by using the received source data payloads and the check data, if all of the lost source data payloads cannot be decoded; and
   a first sending module, configured to send a retransmission request message to a server to request for retransmitting all or part of the needed source data symbols.

8. The client device according to claim 7, wherein the judging module further comprises:
   a first judging unit, configured to judge that all of the lost source data payloads cannot be decoded by using the received source data payloads and the check data symbols, when the number of lost source data symbols is greater than the number of received check data symbols; and/or
   a second judging unit, configured to perform forward error correction decoding by using the received source data symbols and the received check data symbols, and judge that all of the lost source data payloads cannot be decoded if all of the lost source data symbols cannot be restored.

9. The client device according to claim 7, wherein the determining module further comprises:
   a first determining unit, configured to restore a part of the lost source data symbols through forward error correction decoding by using the received source data symbols and the received check data symbols after a reconstructed data block is generated, and using un-decoded lost source data symbols as the source data symbols needed for decoding all of the lost source data payloads; and/or a second determining unit, configured to determine lost source data symbols according to the received source data symbols, determine a minimum set of repairing source data symbols through a forward error correction scheme corresponding to the received check data symbols and the lost source data symbols, and use the minimum set of repairing source data symbols as the source data symbols needed for decoding all of the lost source data payloads.

* * * * *